Dec. 10, 1968
S. B. SMITH
3,415,389
STACKER
Filed Sept. 27, 1966
4 Sheets-Sheet 1
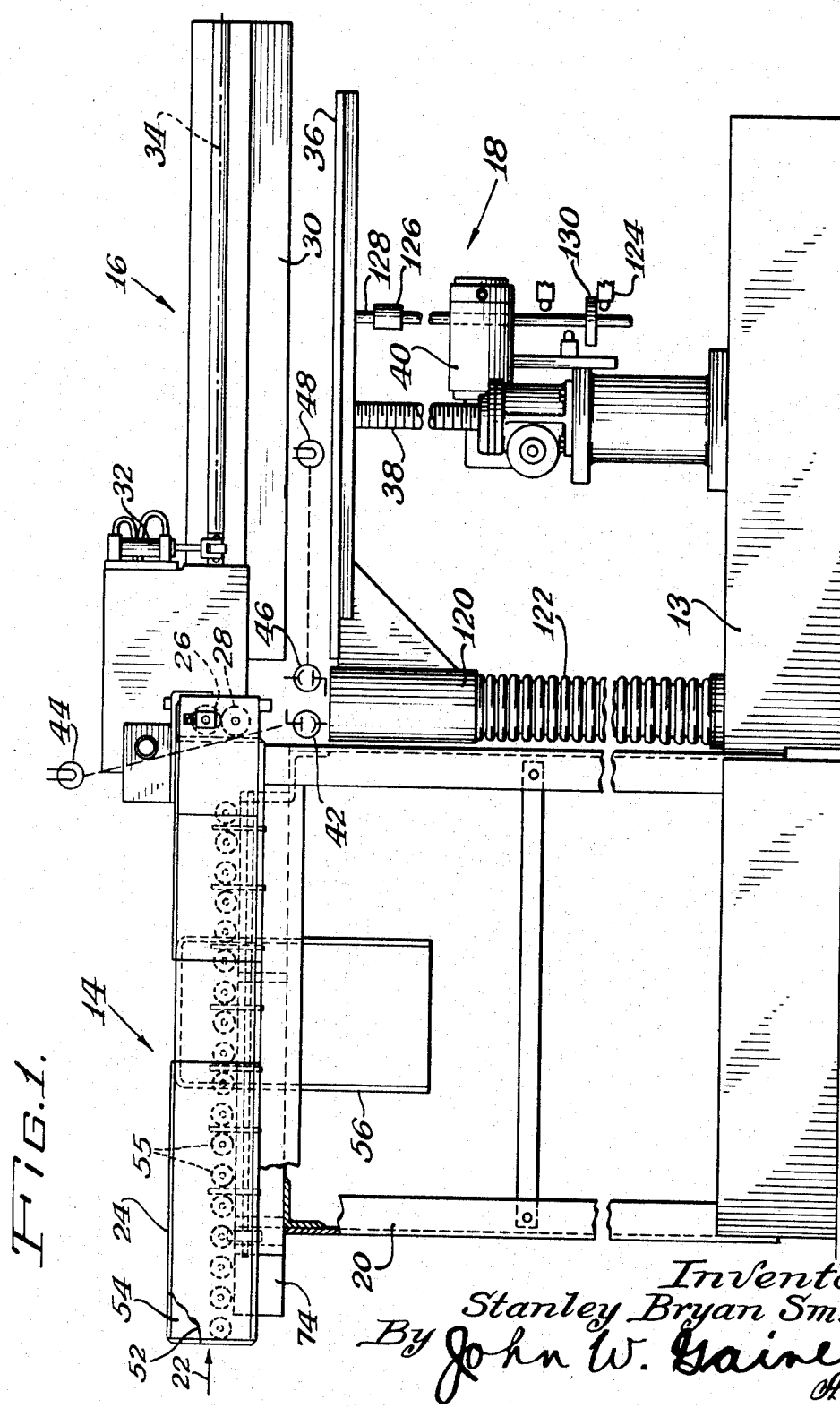
Inventor:
Stanley Bryan Smith
By John W. Gaines
Atty.

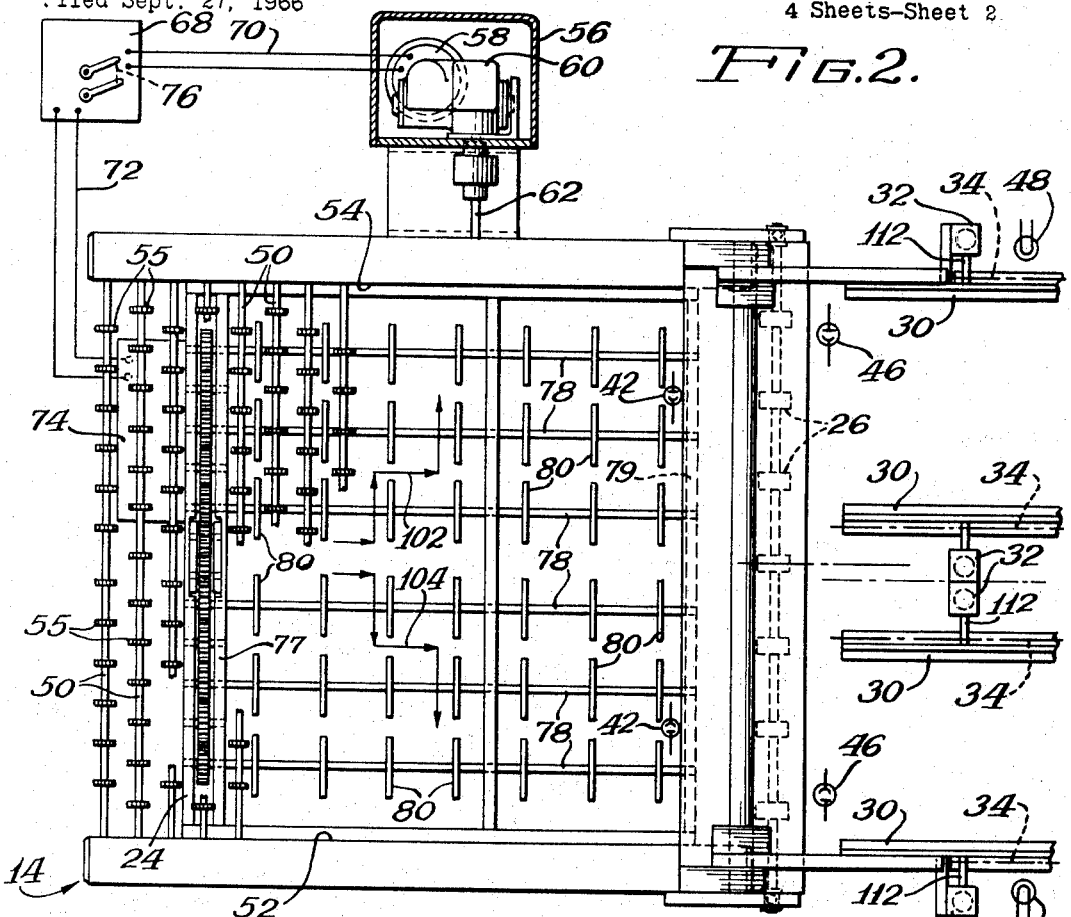
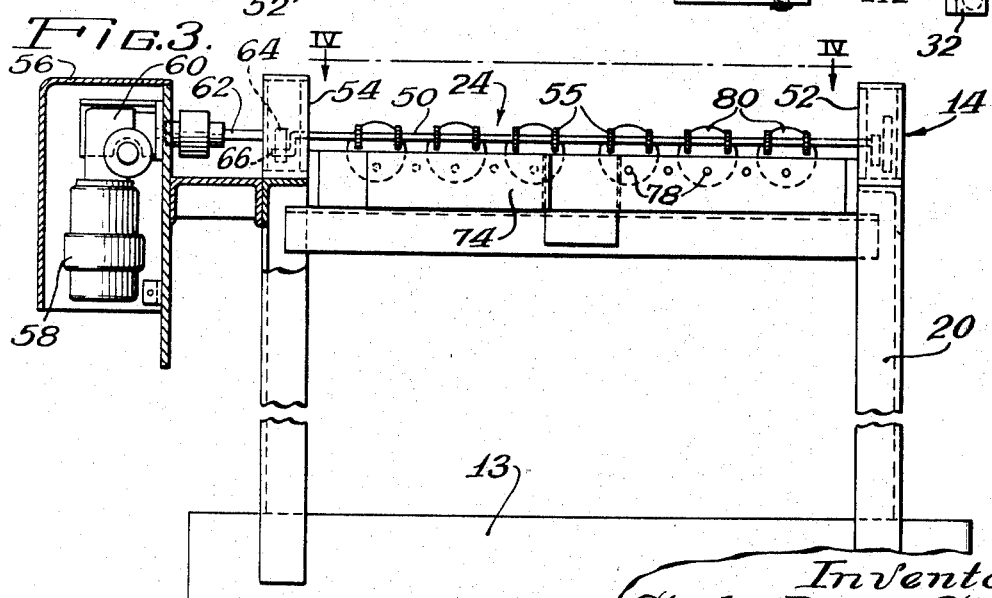

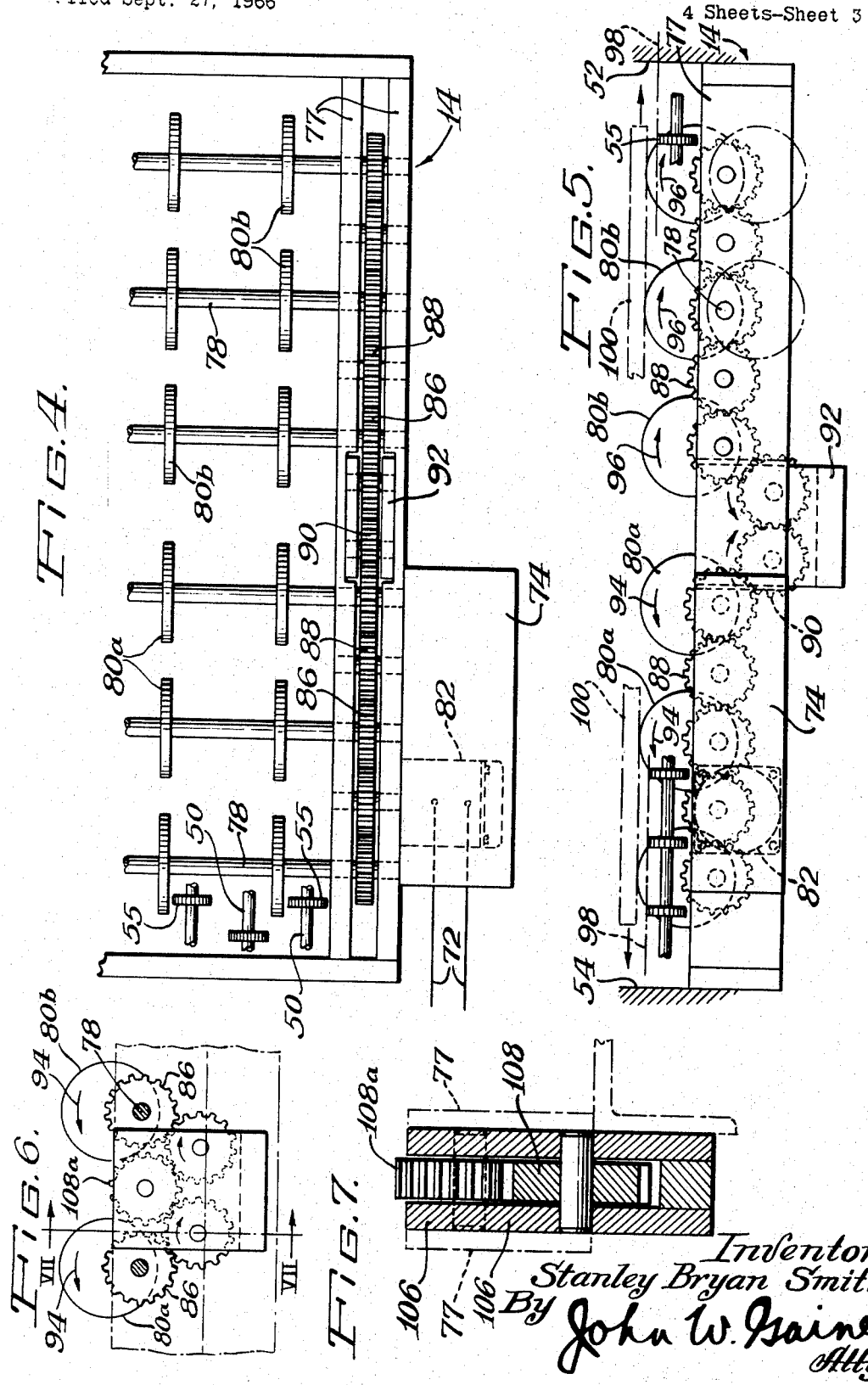

Dec. 10, 1968 S. B. SMITH 3,415,389
STACKER
Filed Sept. 27, 1966 4 Sheets-Sheet 4
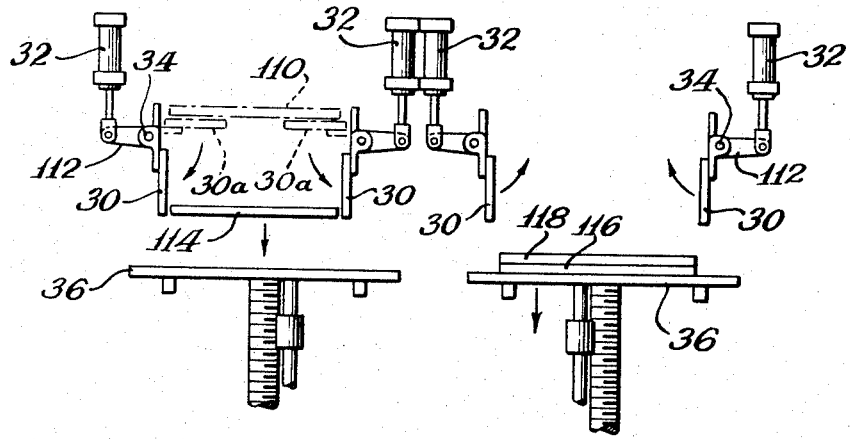
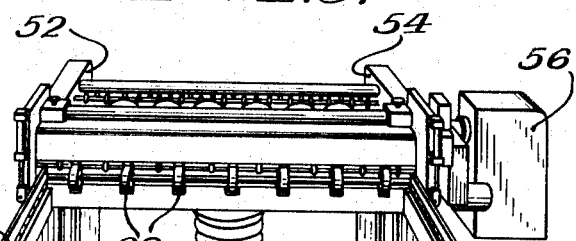
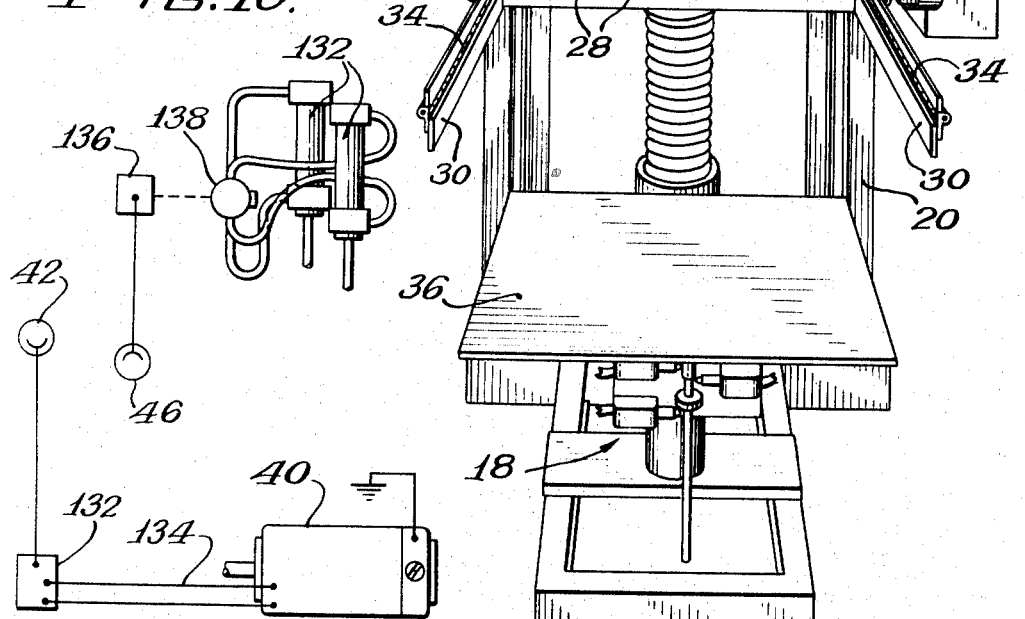
Inventor:
Stanley Bryan Smith
By John W. Gaines
Atty.

United States Patent Office 3,415,389
Patented Dec. 10, 1968

3,415,389
STACKER
Stanley Bryan Smith, State College, Pa., assignor to Chemcut Corporation, State College, Pa., a corporation of Pennsylvania
Filed Sept. 27, 1966, Ser. No. 582,449
15 Claims. (Cl. 214—6)

ABSTRACT OF THE DISCLOSURE

Stacker for stacking articles in a vertically lengthening stack on a downwardly moving receiving table, and having a longitudinal conveyor feeding the articles in edge aligned relation to the stacker. The conveyor is a roller table having power driven elements in multiple rows, alternate ones of which comprise longitudinal rollers, and each remaining one of which comprises a row of eccentrics rotating in a transverse vertical plane so as to swing cyclically up through the plane of the tops of the rollers, laterally transferring the articles thereon gradually against a side rail so that they are edge aligned longitudinally.

---

This invention relates to an article stacker. It more particularly relates to a stacker comprising longitudinal conveying means, a table forming a vertically moving supporting platform for the articles, and stacking means above the table and between it and the conveying means, the stacking means receiving a series of the individual articles, as they are being longitudinally conveyed, and dropping them so as to accumulate in a vertically lengtheing stack as the receiving table, which constitutes the supporting platform, progressively moves downwardly.

A problem with sheet, plate, block, board, and panel articles which are treated or processed individually but later placed in collective stacks for ease in bulk handling, is that some types of such articles must not be scratched. In other words, some types must retain a scratch-free surface coating or pattern which is presented thereby within the "sight" or actual working area of the face of the article, and which is inwardly offset or set back from the unused margins of the article.

Printed circuit boards, for example, are susceptive to damage such as the foregoing, and so it is highly desirable not to drag the actual conductor pattern portions of the board faces across another object, or to slide the boards one across another so that the central working area containing the patterns of conductors becomes scratched up or scuffed.

According to my invention, sliding or the need for sliding the sight of the working face or faces of the articles against another surface is eliminated. Briefly, the articles hereof are aligned along one edge while in the process of being longitudinally conveyed on the conveying means. They are maintained in a precise edge aligned relation while in the process of being fed individually to the stacking means. The articles are finally dropped straight vertically by the stacking means onto the downwardly moving table and, in the process, they form into a square, edge aligned stack, needing no adjustment or straightening for stability as such stack of articles is moved away for further handling.

The alignment phase of the above process is accomplished by a generally longitudinally extending alignment rail provided at one side of the conveying means and substantially in the plane of the conveying surface, and by a plurality of eccentrics which rotate unidirectionally on fixed axes in a transverse relation to the conveying means and thereby oscillate alternately above and below the plane of the conveying surface so as to repetitively lift and bodily transfer the articles into a position with the side edge of the articles riding squarely flush against the alignment rail. The feeding stage is accomplished by narrow, margin engaging arms in the stacking means which are adapted to be occupied by an article being fed, and by nipping rolls which are in receiving relation to the conveying means, and which feed the articles to the arms so as to precisely maintain their edge aligned relation. The dropping phase of the process is accomplished by means which pivot the arms into a vertically depending or dropped position, and which cause the deposit of the articles onto the table by a straight drop, accompanied by no sliding and resulting in a squarely vertical stack.

Hence, the unwanted scratching is obviated by my handling process and apparatus inventions, as will now be explained. Features, objects, and advantages thereof are either specifically pointed out or will become apparent when, for a better understanding, reference is made to the following description, taken in conjunction with the accompanying drawings which show certain preferred embodiments of the inventions and in which:

FIGURE 1 is a right side, elevational view of a handling apparatus embodying the invention;

FIGURE 2 is a top plan view of the conveyor component of the apparatus;

FIGURE 3 is an end elevational view showing the article loading station of the conveyor component;

FIGURE 4 is a top plan view similar to FIGURE 2, but showing details of the driven elements to enlarged scale;

FIGURE 5 is an end elevational view similar to FIGURE 3, but showing details of the driven elements to enlarged scale;

FIGURE 6 shows a modification, in part, of FIGURE 5;

FIGURE 7 is a longitudinal vertical section view taken along the lines VII—VII of FIGURE 6;

FIGURE 8 is an end elevational view showing the article discharging section of the stacker and table components of the apparatus;

FIGURE 9 is an isometric view in end elevation similar to FIGURE 8 but showing a modification; and FIGURE 10 is a schematic diagram of the photocell control circuits appearing in FIGURE 1.

More particularly in FIGURE 1 of the drawings, two framework supporting parts are secured together to form a base 13 common to a conveyor 14, stacking table mechanism 18, and a stacker 16 which is disposed above the table mechanism 18 and operatively between it and the conveyor. A framework 20 is supported on the base 13 and supports the conveyor 14 which receives articles incoming in a direction indicated by an arrow 22. The articles, in the case of rectangular printed circuit boards, for example, come from the conveyor of a conveyorized etcher, not shown, and proceed without interruption on to and along the loading station 24 of the present conveyor 14.

The conveyed articles move longitudinally through the conveyor 14 in a horizontal plane and they reach and are engaged by vertically aligned, upper and lower nipping rolls 26 and 28, respectively. The nipping rolls feed the articles onto narrow, longitudinal stacker arms 30, each controlled by an extensibly and retractively moved air cylinder 32. The cylinders 3 pivot the respective arms 30 about individual longitudinal hinge axes 34.

Each article after occupying a pair of the arms 30 is dropped thereby due to downward pivoting of the arms, and the article is thus deposited on a vertically movable horizontal table 36 forming a supporting platform. The level of the table 36 is controlled by a downwardly moving jackscrew 38, and by a drive motor 40 included in the table mechanism 18, and having a gear connection to a rotatable feed nut that controls the jackscrew.

First photocells, generally indicated at 42, are each vertically in line with an individual light source 44 so as to be darkened or shaded by the leading edge of each succeeding article which approaches the nipping rolls 26 and 28. Second photocells, generally indicated at 46, are each diagonally in a horizontal line with an individual lamp or other light source 48 so as to be darkened whenever the article at the top of a lengthening stack intervenes in the line of the light.

In operation, the apparatus of FIGURE 1 moves a first board or other article through the nipping rolls onto a pair of the arms 30, whence the on-coming next article blocks the light falling onto one of the first photocells 42. The stacker arms 30 drop the first article, and continue to drop articles in succession in a stack and eventually the top article of the stack interrupts the light from the source 48 to the second photocell 46. By actuating control means hereinafter described, the photocell 46 causes the motor 40 and the table 36 in the mechanism 18 to lower the stack so that light passes over the top and again shines on the photocell 46. Each subsequent time at which the top of the stack intervenes and shades the photocell, the table 36 is further lowered and keeps the top of the vertically lengthening stack always at a pre-determined level or range of levels below the path of swing of the arms 30 of the stacker.

Conveyor and drive—FIGURES 2 and 3

Beginning at the loading station 24 thereof, the conveyor 14 for its full length comprises rows of rollers 55 and a series of cross shafts 50 therefor which pass at their outer ends through a pair of generally longitudinally extending alignment rails 52 and 54 disposed at the respective right and left sides of the apparatus. Each cross shaft 50 has a fixed axis, and carries a plurality of the rollers 55, which are spaced apart, toothed plastic rollers and which mutually define a horizontal conveying surface between the side rails 52 and 54.

Inside an electric motor box 56 which is carried by a bracket outside of the left side rail 54, a conveyor motor 58 is connected through right angle, drive gearing 60 and a slow speed shaft 62 to drive the rollers 55 with unidirectional, fairly constant rotation.

The final connection, not shown, is made in a manner such that the drive oscillates walking beams, one of which is shown at 64, endless closed paths in two individual, longitudinal vertical planes. Each shaft 50 is connected by a crank 66 at each end with the walking beam 64 at that end so as to be driven thereby exactly in phase with the rotation of all roller shafts 50.

A motor controller 68 has electrical wire connections 70 to the conveyor motor 58 and also has electrical connections 72 to a motor in an eccentric drive-motor box 74 as will now be explained. Because of an appropriate mechanical interconnection generally indicated at 76, the speed handles on the controller 68 can provide a common speed control so that the eccentric drive speed is at all times proportionate to conveyor speed.

Eccentrics and drive—FIGURES 4 and 5

Alternating with the rollers 55 and having their longitudinally extending supporting shafts 78 disposed at a level below the row of roller shafts 50, sets of eccentrics are mounted fast to the supporting shafts 78. The shafts 78 are journalled on fixed axes in holes formed in dual front frame cross rails 77 and in a rear frame cross rail 79 (FIGURE 2). The set of eccentrics in the left half of the table is designated 80a as viewed in FIGURES 4 and 5, and the set on the right is designated 80b.

An electric motor 82 in the eccentric drive-motor box 74 is connected to an input gear 84 included as part of a coplanar train of gears which further includes shaft connected gears 86, and idler gears 88 alternating with the gears 86. The two nearest together shafts 78 among the shafts 78 carrying the adjacent sets of eccentrics 80a and 80b are interconnected by the gears 90 in a two gear box 92, and the two gears thus prolong the train to include further shaft connected gears 86, and idler gears 88 alternating with the shaft connected gears. The idler gears 88 are freely rotatable on individual stub shafts.

The direction of rotation of the motor 82 and the arrangement in the gear train are selected such that the eccentrics 80a have the unidirectional rotation indicated by the arrows 94, the eccentrics 80b have the unidirectional rotation indicated by the arrows 96, and the gears 90 have contra-rotation in the directions indicated by two opposing arrows in FIGURE 5.

In being conveyed on the conveyor 14, the articles have interrupted motion because they are repeatedly lifted from the plane 98 of the conveying surface defined by the tops of the rollers, and transferred upwardly, and through an article position 100, and thence are left at a point of redeposit on the conveying surface by an amount closer to the near one of the rails 52 and 54. The resultant cyclic motion in paths at right angles to each other continues on the conveyor, and two cycles are indicated, by the respective vectors 102 and 104 in FIGURE 2, adjacent one another above the respective sets of eccentrics 80a and 80b.

In rapid order, the articles progress through the positions shown by the dotted lines 100 until their rectangular outer edges ride flush against the respective alignment rails.

Eccentric drive modification—FIGURES 6 and 7

If it is desired that all eccentrics have the same unidirectional rotation as indicated by the arrows 94, a three gear box 106 is substituted for the two gear box 92. The three gears 108 in the box 106 include a reversing gear specially designated 108a and enabling the shaft connected gear 86 adjacent thereto on the right to rotate in the same direction therewith and the eccentric shafts 78 to rotate in the same direction therewith.

In that way, wider boards can be handled by the table and both sets of eccentrics 80a and 80b will cooperate in precisely edge aligning the boards or other articles solely along the left side rail 54, not shown. The boxes 92 and 106 are readily interchanged one for the other and a single bolt, not shown, is adequate at the bottom of the box in use to hold it in place.

Dual-unit stacker—FIGURES 1, 2, and 8

The paired stacker arms have a normal receiving position, and the nipping rolls 26 and 28 (FIGURE 1) feed individual articles thereto into an occupying position indicated at 110 in FIGURE 8. The article thus clears the rolls and comes to a stop, with the marginal edges of the article resting upon a pair of such arms 30 which extend horizontally inwardly from the hinges 34 toward one another when in the receiving position. Such position, indicated by the broken lines 30a in FIGURE 8, is maintained by the respective stacker cylinders 32 when in their extended position, the cylinders being connected to the arms by levers 112.

Preferably, each arm 30 projects out into the span between hinges no more than about 12½% of the distance across the span, so as to contact a bare minimum of the lower face of the article. In one physically constructed embodiment of the invention, each arm projected out only about 9% of the span distance and hence touched only the outside edges of the side margins of the article.

Retractive movement of the cylinders 32 swings the arms on their hinges to a vertically depending position therefrom as shown by the solid lines 30 in FIGURE 8.

In operation, the stacker cylinders 32 retract, causing the arms 30 to drop and thus allow an article to be deposited onto the table 36 in a path of drop followed by a falling article 114 as shown in solid lines. Eventually a full stack of the articles forms, as illustrated by the initial bottom articles 116 and 118 on one of the tables 36. Thereafter, the cylinders 32 re-extend, pivoting the arms 30 into their horizontal position so as to receive and be occupied by the next oncoming article.

*Modified (single) stacker—FIGURE 9*

This modification of the stacker is for use when the apparatus is converted for wide articles by means of the three gear box 106 of FIGURE 6. Only the alignment rail 54 at one side of the conveyor table does the aligning. Precisely edge aligned, large width articles as they ride along the rail 54 at the side are fed by the nipping rolls, of which the lower roll 28 is shown, onto the single pair of arms 30. Each occupying article is deposited in a single stack on the single stacker table 36.

The upper and lower rolls 26 and 28 are actually two sets of spaced apart plastic rollers. The lower set is fast to a power driven shaft and provides the feed drive. The upper set is fast to a shaft which is carried in vertical slots in the side rails at the ends, and which is spring biased downwardly toward the lower set of rollers.

*Table—FIGURE 1*

The weight supporting jackscrew 38 of the table 36 is assisted by a cantilever type head 120 and guide structure 122 in causing the table 36 to track straight vertically. Sets of limit stop switches 124 are fixed in the path of an actuator 126 carried on a depending rod 128 supported by the underside of the table. The rod 128 passes through a relatively movable control collar 130 appearing adjacent the bottom of the rod.

The motor 40 thus automatically stops the jackscrew 38 at upper and lower limits of travel and, each time a stack is unloaded from the down-moving table 36, the table is returned by the motor 40 to its uppermost position and then restored to automatic operation under photocell control.

The photocells are illustrated schematically as being photoelectric cells, but in practice photoresistors are preferably used in the circuits, now to be discussed.

*Stacker and table controls—FIGURE 10*

Each photocell in the first photocells 42 is connected to a motor control 132 which serves both automatic and manual functions. Electric wires 134 interconnect the control 132 and the table motor 40.

In operation, the controller 132 in response to the photocell 42 being placed in darkness causes the motor 40 to operate in a direction lowering the table. Each time the photocell 42 is re-illuminated due to being uncovered by the top of the downwardly moving stack, a stopping signal from the photocell goes to the controller 132 which thereupon stops the motor 40.

Each photocell of the second photocells 46 is connected by means of a solenoid 136 to a time delay valve 138. The valve controls a pair of the air cylinders 32.

In operation the solenoid 136, in response to a darkening photocell signal due to passage of a succeeding article, operates the valve 138 through a quick displacement, slow return cycle. The valve 138 promptly shifts into the displaced position so as to retract the cylinders 32 simultaneously, delays at that point for a pre-determined time, and then shifts back to the returned position so that the cylinders 32 simultaneously extend.

As a consequence, the approach of the next succeeding board or article makes the arms, not shown, drop an occupying article immediately, and the arms then depend for a sufficient time for the occupying board to clear the arms before they are restored by the cylinders 32 to a horizontal position.

As herein disclosed, the invention is shown to embody eccentrics, in operation in the roller table, which cause the direction of board travel to alternate several times before a board transfers into a snug riding position against an alignment rail of the conveyor. If all eccentrics in each common plane are replaced by a walking beam, the same transfer action can be effected, but the present arrangement of alternating rollers and eccentrics will lose some of its compactness because more room is taken by walking beams, and by the attendant crank arms that are required. Although one embodiment hereof employs sets of eccentrics which contrarotate at a 180° phase angle to one another, it is evident other phase relationships can be used to advantage and the adjustment can be effected with the two gear box 92 slightly withdrawn from the fully meshed position.

Variations within the spirit and scope of the invention described are equally comprehended by the foregoing description.

What is claimed is:
1. In article handling apparatus:
   a table for longitudinally conveying the articles, having longitudinally extending alignment rails at the sides and having driven carrying elements establishing the plane of the conveying surface between the side rails; and
   second driven carrying elements arranged in alternation with the first named elements in the conveyor table, the second elements continuously orbiting in individual transverse vertical planes at locations so as to move in endless closed paths through the plane of the surface of the conveyor, whereby they initiate contact with the longitudinally moving articles at, and lift them from, the surface of the conveyor, and independently carry the articles, in a path substantially at right angles, to a point of deposit on the surface of the conveyor table closer to a side rail; such interrupted, mutually right angular paths of movement, upon completion of the cycle at said point of deposit whereby the motion is re-changed, at right angles, to another longitudinal path, being immediately followed by several complete cycles of the same right angular movement in succession whereby the articles engage a side rail to align the articles along one edge.

2. The invention of claim 1, the second elements characterized by eccentrics having longitudinally extending supporting shafts which are generally in a horizontal row and which drive the eccentrics so that a plurality swing up simultaneously and down simultaneously and at a speed generally proportional to the conveyor table speed.

3. The invention of claim 2, the conveyor table characterized by a roller conveyor table, wherein the first elements comprise conveyor rollers having transversely extending, second supporting shafts, which shafts are in a generally horizontal row at a different level from the row of first named shafts, and which drive the conveyor rollers in synchronism to one another.

4. The invention of claim 3, characterized by there being side by side pluralities of the eccentrics in the table, the eccentrics of each plurality having synchronism with one another but contrarotation to the eccentrics of the plurality at the other side of the table, the plurality of eccentrics at each side coacting with the table rollers so that the longitudinally conveyed articles being contacted by that plurality are repetitively being transferred thereby toward the side rail at that side.

5. The invention of claim 1, characterized by means to which the articles are fed by the conveyor table, said means being aligned in receiving relation to the side rails to receive articles in their edge aligned relation aforesaid.

6. The invention of claim 5, said means characterized by a stacker, and intervening nipping rolls in receiving relation from the conveyor table effective to force the articles in their edge aligned relation onto the stacker.

7. The invention of claim 6, the nipping rolls characterized by sets of upper and lower rollers in opposing relation, one set comprising a plurality of rollers having a common, supporting, power shaft driving them in synchronism, and the other set comprising idler rollers having spring loading means biasing them in the direction of the rollers of said one set.

8. The invention of claim 4, further characterized by dual stacker units which are arranged side by side and to which articles are fed by the conveyor table in two series of the articles each in a precisely edge aligned relation; and nipping rolls in receiving relation from the conveyor table effective to force the articles leaving one side rail and the articles leaving the other side rail to enter upon the respective dual units, the articles of each series being maintained by the nipping rolls in their edge aligned relation.

9. The invention of claim 5, the means characterized by a stacker having narrow arms which receive the articles, and are engageable by, and along the opposite side edges of, the articles so as to bridge between the arms when in occupancy thereon;

said arms having a pivoted position into which they are moved for dropping the articles; and means for initiating movement of the arms to the pivoted position immediately they are occupied by an article, and for restoring the arms to an unpivoted position after the occupying article drops.

10. The invention of claim 5, the means characterized by a vertically moving table on which the articles are deposited in a stack by, and beneath, the stacker; and stack sensitive, table control mechanism for lowering the table by amounts to maintain the top of the stack approximately at a pre-determined level below the stacker.

11. Article handling apparatus comprising:

a conveyor for longitudinally conveying the articles;

a vertically moving table onto which the articles are to be stacked;

a stacker above the table and operatively between it and the conveyor for depositing the conveyed articles in a stack on the table;

stack sensitive table control mechanism for lowering the table by amounts to maintain the top of the stack approximately at a pre-determined level below the stacker;

the conveyor characterized by a roller table having longitudinally extending alignment rails at the sides and having rollers establishing the plane of the conveying surface between the side rails; and eccentrics, the rollers and the eccentrics being power driven on fixed axes, with the rollers being longitudinally oriented and the eccentrics transversely oriented in the table;

the eccentrics arranged in alternation with the rollers in the roller table so as to move through the plane of the surface of the conveyor, whereby the eccentrics initiate contact with the longitudinally moving articles at, and lift them from, the surface of the conveyor, and independently carry the articles, in a path substantially at right angles, to a point of deposit on the surface of the conveyor closer to an alignment rail by cyclic action.

12. The invention of claim 11, characterized by such interrupted, mutually right angular paths of movement, upon completion of the cyclic action at said point of deposit whereby the motion is re-changed to a longitudinal path, being immediately followed by several complete cycles of the same right angular movement in succession.

13. The invention of claim 11, the stacker characterized by nipping rolls in receiving relation to the conveyor table effective to force the articles therefrom in their edge aligned relation onto the stacker; and narrow receiving arms on the stacker engageable by the articles along their opposite side edges, so that each article bridges between the arms;

said arms being pivotally supported and having means for moving them into a pivoted position so that the occupying article is dropped thereby from between the arms.

14. The invention of claim 5, the means characterized by narrow arms adapted to be occupied by individual articles in succession, the arms having supporting hinges at their longitudinal outer edges and having an unpivoted, inwardly extending position in which the arms are in the plane of the span between hinges; and means to pivot the arms into a depending position each below one hinge, to clear the path for dropping an occupying article from the span between the arm hinges.

15. The invention of claim 14, each arm in the unpivoted position characterized by a width of no more than approximately 13% of the span between hinges.

References Cited

UNITED STATES PATENTS

| | | | |
|---|---|---|---|
| 2,017,535 | 10/1935 | Hammer | 214—16.6 |
| 2,946,465 | 7/1960 | Raynor | 214—6 |
| 2,985,322 | 5/1961 | Parker | 214—6 |
| 3,260,335 | 7/1966 | Verreault | 198—127 X |

FOREIGN PATENTS 881,259   11/1961   Great Britain.

GERALD M. FORLENZA, *Primary Examiner.*

R. J. SPAR, *Assistant Examiner.*

U.S. Cl. X.R.

198—29, 219